Sept. 4, 1962 G. HAGEMANN ET AL 3,052,605
FUNGICIDAL COMPOUND AND PROCESS OF MAKING SAME
Filed July 25, 1960
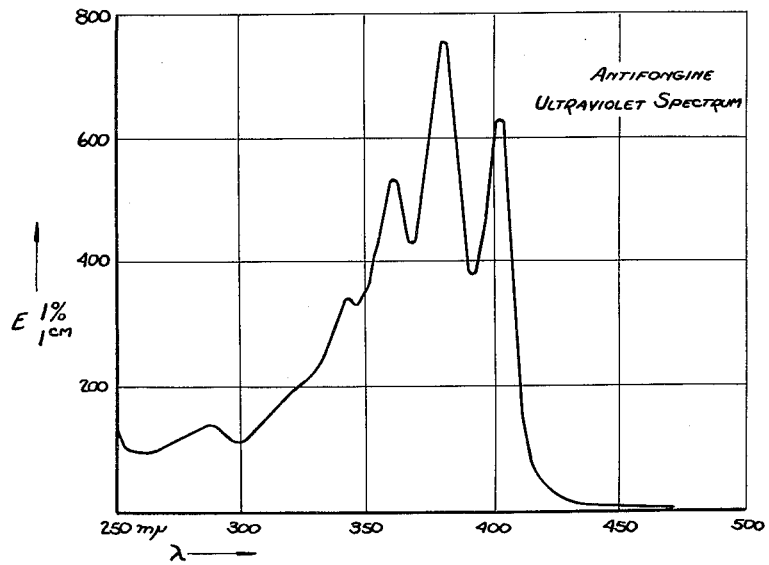
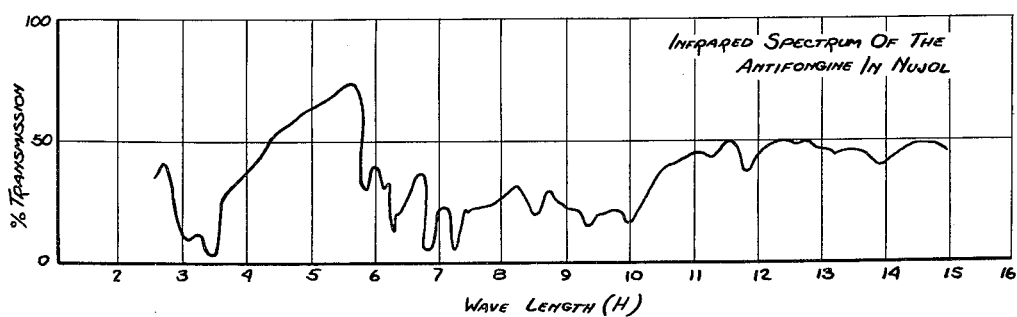
INVENTORS
GUY HAGEMANN
GERARD NOMINE
LUCIEN PENASSE
JEAN TEILLON
BY
AGENT

United States Patent Office 3,052,605
Patented Sept. 4, 1962

3,052,605
FUNGICIDAL COMPOUND AND PROCESS OF MAKING SAME
Guy Hagemann, Vincennes, Seine, Gerard Nominé, Noisy-le-Sec, Seine, and Lucien Penasse and Jean Teillon, Paris, France, assignors, by mesne assignments, to Roussel-UCLAF, S.A., Paris, France, a corporation of France
Filed July 25, 1960, Ser. No. 47,342
Claims priority, application France June 22, 1955
11 Claims. (Cl. 167—65)

The present invention relates to a new fungicidal agent and, more particularly, to the fungicidal compound designated as Antifongine, and to a process of preparing the same by means of a biological process.

The present application is a continuation in part of co-pending applications Serial No. 746,560, filed July 3, 1958, and entitled "Fungicidal Compound and a Process of Preparing Same," now abandoned, and Serial No. 592,258, filed June 19, 1956, and entitled "New Antibiotic and Method of Preparing Same," now abandoned.

It is one object of the present invention to provide the highly effective fungicidal compound designated as Antifongine which is useful not only in the industrial field but also, more particularly, in the agricultural field where an effective protection against fungi and molds is desired.

Another object of the present invention is to provide a simple and effective process of producing said fungicidal compound.

A further object of the present invention is to provide a new microorganism producing, on cultivating on a suitable nutrient medium, said new fungicidal compound.

Other objects of the present invention and advantageous features thereof will become apparent as the description proceeds.

The fungicidal compound Antifongine obtained according to the present invention is an organic compound which contains carbon, hydrogen, nitrogen, and oxygen. Under a polarizing microscope, the characteristic extinction pattern indicates that the new compound is crystalline. Antifongine represents a yellow powder which, on heating, starts to decompose at 100° C.

Said Antifongine is very soluble in certain solvent mixtures but is of extremely low solubility in water, hydrocarbons, ketones, and chlorinated solvents. It is slightly soluble in lower alcohols and carbon disulfide, and is soluble in propylene glycol, isoquinoline, pyridine, triethylamine, and dimethyl formamide.

On microanalysis, the following values were found in a compound with an ash content of 1.3%: 63.6% C; 7.8% H; 2.8% N.

The results obtained on subjecting the Antifongine to various chemical reactions for its characterization are given in Table A.

TABLE A

| Reaction: | Result |
|---|---|
| Ninhydrin | Negative. |
| Benzidine | Do. |
| Tollens | Do. |
| 2,4-dinitro phenyl hydrazine | Do. |
| Ferric chloride | Do. |
| Picric acid | Do. |
| Flavianic acid | Do. |
| Reinecke salt | Do. |
| Ceric nitrate | Weak reaction. |
| Hydroxylamine | Amorphous precipitate. |

The fungicidal compound Antifongine according to the present invention dissolves in the following concentrated acids: Sulfuric acid, phosphoric acid, hydrochloric acid, perchloric acid, and formic acid, thereby yielding an intense blue-green color which turns yellow on dilution with water (presence of multiple conjugated double bonds). Acetic acid does not give said color reaction.

The Antifongine obtained by the process according to the present invention is furthermore characterized by its specific ultraviolet and infrared spectra.

Its ultraviolet absorption spectrum in a mixture of methanol, acetic acid, and water (7:2:1 by volume) is shown in FIG. 1. A number of maxima at the wave lengths listed in Table B are observed. The corresponding extinction values E are calculated for a thickness of the solution layer of 1 cm. and for a concentration of 1%:

TABLE B

| (In angstroms): | $E_{1\ cm.}^{1\%}$ |
|---|---|
| 2910 | 140 |
| 3450 | 340 |
| 3600 | 540 |
| 3800 | 764 |
| 4050 | 636 |

These maxima seem to indicate the presence of a polyene structure and most probably the structure of a conjugated heptaene.

FIG. 2 shows the infrared absorption spectrum of Antifongine which has transmission maximums at $5.85\mu$, $6.12\mu$, $9.63\mu$ and $13.16\mu$; absorption maximums at $6.27\mu$, $8.5\mu$, $9.35\mu$, $10.0\mu$, $11.28\mu$ and $11.82\mu$; and shoulders at $6.40\mu$, $8.85\mu$, $9.10\mu$ and $10.30\mu$.

The fungicidal compound Antifongine has a high activity against various yeasts and molds. The said fungicidal compound shows also an interesting activity against phytopathogenic fungi which cause infections on vegetables and fruit trees. It is highly active against the following microorganisms:

Blastomyces dermatitidis
Candida albicans
Histoplasma capsulatum
Microsporum canis
Sporotrichum schenckii
Trichophyton interdigitale
Trichophyton rubrum
Saccharomyces cerevisiae
Endothia parasitica
Monilia fructigena
Pestalonnia coffeicola
Sterigmatis nigra
Sclerotinia minor
Penicillium italicum
Penicillium digitatum
Alternaria oleracea
Glomerella cingulata
Fusarium coeruleum
Fusarium avenaceum
Fusarium oxysporum
Ustilago zeae
Dotichiza populea
Colletotrichum gramincarum
Incinula (Oïdium)
Venturia inaequalis (yeast)
Botrytis cinerea The following Table C gives the minimum inhibitory concentration (threshold value) in γ/cc. determined on an agar containing culture medium:

TABLE C

| Microorganism: | Threshold value in γ/cc. |
|---|---|
| Saccharomyces cerevisiae L.41 | 0.01 to 0.25 |
| Torula utilis | 50 to 100 |
| Candida albicans | 0.1 to 1 |
| Botrytis allii | 50 to 100 |
| Botrytis roussillon | 5 to 20 |

| | |
|---|---|
| *Calonectria decora* | 1.0 |
| *Clitocybe tabescens* | 1.0 |
| *Colletotrichum lindemuthianum* | 1.0 |
| *Cryptococcus neoformans* | 1.0 |
| *Didymella lycopersici* | 1 to 5 |
| *Ustilago avenae* | 1 |
| *Mucor microsporus* | 350 |
| *Choanephora cucurbitarum* | 4.5 |
| *Cephalotecium roseum* | 35 |
| *Alternaria solani* | 1.0 |
| *Penicillium italicum* | 100 |
| *Fusarium caeruleum* | 100 |
| *Ustilago zeae* | 50 |
| *Monilia fructigena* | 10 |

Therefore, it represents a valuable agent for the treatment of infections caused by such microorganisms.

Antifongine differs from trichomycin and candidin by its insolubility in water and slightly alkaline solutions wherein said trichomycin and candidin are soluble.

Antifongine differs from nystatin, fungicidin, amphotericin A, and fradicin by the position of the maxima in its ultraviolet spectrum.

Furthermore, it differs from trichomycin, ascosin, and candicidin by its effectiveness on *Candida albicans*. It prevents proliferation of said microorganism in a concentration of only 0.1 γ/cc. to 1.0 γ/cc.

The toxicity of crude Antifongine $(E_{1\ cm.}^{1\%} - 230$ at 3800 angstroms$)$ determined on mice, is about 3.5 mg./kg. when applied intravenously, 25 mg./kg. when applied subcutaneously, and at least 2000 mg./kg. when applied orally.

The chronic toxicity was determined on 4 groups of 10 male rats each, said rats weighing, on an average, 90 g. One group of rats served as control group; they received by means of a stomach sound an aqueous solution of the dispersing agent, such as a dispersing agent of the type sold under the trademark "Tween." The other three groups received the same solutions having dispersed therein an amount corresponding to a dose of 10 mg./kg., 20 mg./kg., or, respectively, 50 mg./kg. of Antifongine also by means of a stomach sound. Said amounts of Antifongine were administered daily, except on Sundays, for one month. The mortality of the animals was:

TABLE D

| Dose of fungicidal compound: | Mortality |
|---|---|
| Controls | 5 of 10 animals. |
| 10 mg./kg. | 2 of 10 animals. |
| 20 mg./kg. | Do. |
| 50 mg./kg. | 3 of 10 animals. |

In all cases the animals died due to endothoracic infections (pneumonia, pleurisy, pericarditis purulentis). Thus their death cannot be attributed to the Antifongine as is clearly shown from the larger number of deaths in the control group. No differences in the growth rate were observed between control animals and treated animals. Hematological tests carried out before and after administration of Antifongine did not show any abnormality. Autopsy of the animals at the end of the treatment failed to show macroscopically any changes. Liver and kidney were investigated histologically without any abnormal finding. Thus the chronic toxicity of Antifongine is also quite low.

Topical application of Antifongine in the form of a 5% ointment to the depilated skin of a guinea pig daily for 4 days did not show any irritation. Daily application for 6 days to the mucous vulva of a female dog was well tolerated. Daily application for 5 days to the conjunctiva of a rabbit caused maximum irritation within about 2 hours which almost completely disappeared after 24 hours. However, application of the ointment excipient alone produced the same irritating effects indicating that irritation is due to the excipient and not to Antifongine.

The particularly low toxity of Antifongine permits its utilization in veterinary medicine as agent against mycosis and the like diseases. For instance, when repeatedly applying Antifongine orally to mice infected with *Candida albicans*, the disease is attenuated and the life of the treated animals is considered prolonged.

When determining the in vitro effectiveness of Antifongine on the germination of conidia of *Venturia inaequalis* or apple scab, the crude Antifongine proves to be fungistatic in a concentration of 250 γ/cc.

Furthermore, studies on the usefulness and effectiveness of Antifongine on other phytopathogenic fungi shows the following results:

(a) It is highly effective against the spores of *Alternaria oleracea* and *Glomerella cingulata*; when testing according to the method of MacCallan, total inhibition of germination is found at a concentration of 100 γ/cc.

(b) An interesting activity is found against *Botrytis cinerea* (gray mold rot of grapes), i.e. beginning inhibition of germination in a concentration of 100 γ/cc. and high effectiveness in a concentration of 500 γ/cc.

(c) Very marked activity is observed against *Dothichiza populea* (causing a particular disease of the poplar tree) in a concentration of 500 γ/cc. and against *Colletotrichum gramincarum* (causing a particular fungus disease of corn) in a concentration of 100 γ/cc. to 500 γ/cc.

(d) Good protection against infection of vine leaves by *Incinula necator* (Oïdium species) is afforded by Antifongine on spraying vine leaves separated from the plant and kept alive with an aqueous suspension containing 1% of said compound.

When using in the experiments leaves removed from plants, a very remarkable activity on spot diseases in fruit trees such as caused by *Venturia inaequalis* is observed. The infection is completely inhibited by the application of an aqueous suspension of the crude Antifongine in a concentration of 250 γ/cc., even two weeks after the treatment.

No apparent signs of a phytotoxicity were observed in the various experiments when applying an agricultural preparation of the crude Antifongine to various plants, for instance, grapevine, fruit trees, potatoes, and tomatoes.

The agricultural preparation of Antifongine mentioned hereinabove consists of a powder of dried mycelium which contains about 1.5% of the crystalline Antifongine.

The crude Antifongine is an amorphous extraction product which contains about 30% of the crystalline Antifongine.

The antifungal activity of the Antifongine has been studied more particularly on *Saccharomyces cerevisiae* and on various clinical strains of Candida and has been compared with the activity of Nystatin as will be shown in the following tables.

(A) *Saccharomyces cerevisiae*.—The pH of the culture medium was 7.0.

(a) Saccharomyces ATCC 9763:

TABLE E

| Cultivation temperature | Determination after— | Minimum inhibitory concentration in γ/cc. | |
|---|---|---|---|
| | | Nystatin (3,170 U/mg.) | Antifongine (purified sample 2116-144-3) |
| °C. 24 37 | Hours 48 48 | 0.8-1.0 3.5 | 0.15 0.15-0.2 |

Under these conditions, Antifongine was five to six times more effective on Saccharomyces than Nystatin. Apparently it is also more stable in the culture medium at 37° C. than Nystatin.

(b) Saccharomyces ATCC 9761:

TABLE F

| Cultivation temperature | Determination after— | Minimum inhibitory concentration in γ/cc. | |
|---|---|---|---|
| | | Nystatin (3,170 U/mg.) | Antifongine (purified sample 2313-191-I |
| °C. | Hours | | |
| 37 | 18 | 2 | 0.15 |
| 37 | 96 | 10 | 10 |

(B) *Candida*.—The pH of the culture medium was 7.0.

was not too well tolerated when administered subcutaneously to mice in the form of an aqueous suspension of 2 mg./cc. or 10 mg./cc., all further studies of the in vivo activity were made by oral administration. Antifongine was well tolerated even in amounts of 10 mg. per mouse.

(A) *Infections with* Candida albicans.—(a) Tests with mice: The mice were infected by intraperitoneal injections of a culture of *Candida albicans* (1 mg. of cells in 1 cc. of mucin). Antifongine was administered in the form of an aqueous suspension of a powder thereof, by means of the stomach sound once daily for 10 days. Parallel series of mice were treated in the same manner with Nystatin (purified powder Squibb with 3360 u./mg.). It may be mentioned that commercial Nystatin type Sifa has ordinarily an activity of only about 2000 u./mg. Trichomy-

TABLE G

| Type | Strain | Origin | Nystatin after— | | | | Antifongine after— | | | | |
|---|---|---|---|---|---|---|---|---|---|---|---|
| | | | 18hrs. | 36hrs. | 48hrs. | 96hrs. | 18hrs. | 36hrs. | 48hrs. | 96hrs. | |
| Candida albicans | NRLL 7-477 | Collection | 2 | | 2.5-4 | 10 | 0.15 | | 0.5 | 5 | |
| Candida albicans | 4797 | | | | 3 -4.5 | | | | 0.75 | | |
| Candida albicans | 4892 | Bile | 1 | 4 | 3 -4.5 | 5 | 0.25 | 2 | 0.5 | 20 | Charge No. 2116-144-3. |
| Candida albicans | 4326 | | | | 4 | | | | 0.5 | | |
| Candida albicans | 4929 | | | | 4 | | | | 0.5 | | |
| Candida albicans | 11676 | | | | 4 | | | | 0.25 | | |
| Candida albicans | 8275 | Excrement | 0.4 | 2 | | | 10 | 0.15 | 1.5 | 20 | |
| Candida albicans | 8304 | do | 2 | 4 | | | 15 | 0.2 | 2 | 40 | |
| Candida albicans | 8292 | do | 2 | 4 | | | 5 | 0.25 | 3 | 15 | |
| Candida albicans | 8097 | do | 1 | 4 | | | 5 | 0.25 | 2 | 20 | Charge No. 2313-191-I. |
| Candida albicans | 7610 | do | 2 | 4 | | | 10 | 0.3 | 2 | 15 | |
| Candida albicans | 15566 | do | 1 | 4 | | | 10 | 0.15 | 2 | 20 | |
| Candida pseudotropicalis | 8287 | do | 1 | 4 | | | 5 | 0.25 | 2 | 15 | |
| Candida pseudotropicalis | 8295 | do | 2 | 4 | | | 5 | 0.25 | 3 | 15 | |
| Candida tropicalis | 16045 | Sputum | 2 | 4 | | | 5 | 0.25 | 3 | 15 | Charge No. 2313-191-I. |
| Candida krusei | 32 | Urine | 0.6 | 4 | | | 10 | 0.25 | 4 | 40 | |
| Torulopsis (Cryptococcus) neoformans | 453 | | | | | | | | <0.03 | | Charge No. 2313-65-V. |
| Torulopsis (Cryptococcus) neoformans | 454 | | | | | | | | 0.05 | | |

These tests show that the fungistatic activity of Antifongine against Candida is, on the average, six times greater than that of Nystatin after 18 hours. This difference remains the same after 36 hours and after 48 hours. After 96 hours the activity of Antifongine is, in general, somewhat inferior to that of Nystatin. This is apparently a real difference between the two compounds and is due to their fungicidal activity as well as to their stability at 37° C. on prolonged contact for more than 48 hours with the culture medium. For practical purposes this difference is of no significant importance because an antifungal agent will ordinarily be completely eliminated after 48 hours.

The following tests prove that the fungistatic activity of Antifongine was not reduced in the presence of agents which are effective against bacteria. These tests were carried out in vitro with several antibiotics. The results are given in the following Table H:

TABLE H

[Minimum inhibitory concentration in γ/cc. Antifongine sample 2116-144-3, culture medium pH: 7.0. *Candida albicans* NRRL-Y-477. Determination after 48 hours at 37° C.]

| Added antibiotics in γ/cc. | Framycetin base | Neomycin base | Tetracyclin | Chloramphenicol | Terramycin base | Streptomycin base |
|---|---|---|---|---|---|---|
| 0 | 0.4 | 0.4 | 0.4 | 0.4 | 0.4 | 0.4 |
| 5 | 0.5 | 0.4 | 0.2 | 0.4 | 0.4 | 0.5 |
| 10 | 0.4 | 0.4 | 0.4 | 0.4 | 0.4 | 0.5 |
| 25 | 0.4 | 0.4 | 0.4 | 0.4 | 0.4 | 0.5 |
| 50 | 0.4 | 0.4 | 0.4 | 0.4 | 0.4 | 0.4 |

The results clearly demonstrate that Antifongine can be used with antibacterial antibiotics without affecting its fungistatic activity.

Since preliminary tests had shown that Antifongine cin, the activity of which had been verified in vitro, did not shown any effectiveness in vivo.

The results of the various tests are compiled in the following Table I:

TABLE I

*Comparative Activity of Antifongine and of Nystatin Against* Candida albicans *as Determined With Mice*

[This table shows the activity expressed in percent determined by mortality of the animals and extent of lesions]

| Daily dose, mg. | Test No. | Antifongine, percent | Nystatin, percent |
|---|---|---|---|
| 10 | 1 | [1] 40 | |
| | 2 | [1] 56 | 27 |
| | 3 | | 28 |
| | 4 | | 36 |
| 3 | 1 | [1] 29 | 36 |
| | 2 | [1] 62 | 59 |
| 2 | 1 | [2] 69 | 53 |
| | 2 | [2] 61 | 26 |
| | 3 | [3] 71 | 86 |
| | 4 | [3] 64 | 44 |
| 1 | 1 | [2] 40 | 38 |
| | 2 | [2] 66 | 27 |
| | 3 | [2] 69 | 73 |
| | 4 | [3] 53 | 20 |
| | 5 | [3] 18 | 30 |
| 0.5 | | [3] 41 | 3 |

[1] Charge No. 2116-131 (crude product).
[2] Charge No. 2669-40 (purified product).
[3] Charge No. 2313-191-I (purified product).

Although there are some variations due to differences in the seriousness of the experimental infection, it is evident that the activity in vivo of Antifongine is superior to that of Nystatin, when administered in equal doses; this superiority is very apparent when given in small doses as follows from Table J.

TABLE J

| Dose, mg. | Antifongine (A), percent | Nystatin (B), percent | Ratio of average activity of A:B |
|---|---|---|---|
| 10 | 48 | 30 | 1,6 |
| 3 | 45 | 48 | 0,93 |
| 2 | 66 | 52 | 1,3 |
| 1 | 49 | 37 | 1,3 |
| 0.5 | 41 | 3 | 13 |

(b) Tests with rabbits: A method of investigating rabbits by exploring laparotomy was established which allows to determine the degree of infection by means of the number of visible micro-abscesses at the perirenal aponeurosis. It was found that Antifongine (Charge No. 2313–69–IIb, purified E=795) when orally administered in doses of 20 mg. per kg. exhibits satisfactory activity against *Candida albicans* infections. Nystatin, when tested under the same conditions, has no noticeable effect and Trichomycin is too toxic even in doses of only 1 mg. per kg.

(B) *Infections with Cryptococcus neoformans.*—The infections were established by intraperitoneal injections of cultures of a pathogenic strain of *Cryptococcus neoformans* of the Pasteur Institute. This microorganism produces in mice septicemia and renal abscesses. With respect to medium serious or serious infections, the activity of Antifongine (Charge No. 2313–191–I), when administered orally in daily doses of 2 mg. per mouse, was 24% and 18%, respectively. Nystatin, under the same conditions did not exhibit any appreciable activity (0% and 5%, respectively) in the same doses. In more moderate infections which cause, however, death of 50% of the test animals on the seventh day, the results were as given in the following Table K.

TABLE K

| Daily oral dose, mg. | Antifongine, percent mortality | Nystatin, percent mortality |
|---|---|---|
| 2 | 20 | 60 |
| 1 | 30 | 60 |

Thus noticeable activity of Antifongine is observed although a dose of 2 mg. is insufficient, while Nystatin is ineffective.

(C) *Various infections.*—While the above given tests were carried out in order to determine the in vivo activity of the Antifongine against various experimental mycoses, said compound was also tested for its activity against other pathogenic agents. However, no significant activity was observed.

(a) Activity against protozoa: *Entamoeba histolytica*: In vivo activity: 10γ to 50γ (less effective than Paromomycin: 5γ to 10γ). Trichomonas: No activity in an oral dose of 5 mg. per mouse.

(b) Influenza virus: No activity in an oral does of 5 mg. per mouse.

All these tests clearly prove that the new Antifongine is in vivo highly effective against various fungi. Its activity against *Candida albicans* is far superior to that of Nystatin, even after remaining in the culture medium for 48 hours, and against *Cryptococcus neoformans*. Its activity is not affected by the presence of antibacterial antibiotics.

In vivo Antifongine has shown to be very effective on oral administration against systemic infections of mice by *Candida albicans*. It exhibits also a very definite activity against infections by *Cryptococcus neoformans*. In these instances its effectiveness is superior to that of Nystatin.

In principle, the process of preparing Antifongine consists in growing a culture of *Streptomyces paucisporogenes* deposited with the American Type Culture Collection under No. ATCC 12596 by aerobic immersed cultivation, for instance, according to the principle of the so-called "multi-stage cultivation process," at temperatures preferably close to 30° C. The fermentation time varies between 48 hours and 150 hours and is preferably about 70 hours. Aeration of the fermentors is preferably regulated in such a way that 0.5 volume to 2 volumes of air per volume of culture medium pass through said medium per minute.

The nutritive medium comprises nitrogen sources, such as corn steeping liquor concentrates, flours, distillery residues, yeasts; carbon sources, such as sugar, dextrines, starches; and different mineral salts which, serving as buffer agents, are indispensable for the growth of the cells. A culture medium which is particularly suitable for the production of Antifongine may, for instance, consist of the following ingredients:

| | Percent |
|---|---|
| Dry corn steeping liquor | 0.8 |
| Soybean meal | 2.5 |
| Dextrin | 1.3 |
| Glucose | 1.0 |
| Calcium carbonate | 0.2 |
| Water | 94.2 |

After fermentation is completed, the mycelium is filtered off. The filtrate is adjusted to a pH-value which is preferably close to 6.0, by the addition of acid and brought into contact with a cation exchange resin, such as, for instance, the cation exchange resin of the carboxylic acid-type synthetic resin sold under the trademark "Amberlite IRC 50" (described in U.S.P. 2,340,111) in its sodium salt form in order to separate the antibiotic compound formed by the fermentation process.

The dried mycelium, obtained by filtration of the culture medium, is extracted by means of methanol containing calcium chloride, adding water to the extracts, evaporating the methanol, filtering off the precipitate, purifying it by chromatographic absorption, and recrystallizing Antifongine in a suitable solvent.

The filtered liquid culture medium which has been treated with the above mentioned cation exchange resin in order to extract the antibotic compound is evaporated to dryness and taken up in methanol. The solution is concentrated and extracted by means of butanol in the presence of water. The resulting butanol solution is concentrated, acetone and petroleum ether are added whereby a precipitate is obtained, a methanol solution of which is treated with a suitable ion exchange resin. The thus purified solution is concentrated and extracted by means of tertiary butanol. The crude Antifongine is obtained thereby. It may be recrystallized as described above.

According to a preferred embodiment of the present invention, Antifongine purified by chromatographic absorption on activated aluminum oxide which is eluted by a mixture of dioxane, water, and butyl acetate (40:52:18) to which 5% of acetic acid has been added. Antifongine is preferably recrystallized from a mixture of pyridine, dioxane, water, and butyl acetate (30:40:52:18)

The microorganism *Streptomyces paucisoporogenes* is a new species which differs, for instance, from *Streptomyces rimosus* in several respects and especially by its ability of producing not only an antibiotic but also the new fungicidal agent according to the present invention.

*Streptomcyes paucisporogenes* which produces these two active agents is a new species of the genus *Streptomyces* of the subdivision Actinomycetes. It is found primarily in soil. It is isolated in form of pure cultures in accordance with conventional processes. *Streptomyces paucisporogenes* grows only poorly on solid culture media generally used for organisms of this type and results in colonies composed of filaments whose more or less branched end portion shows only exceptionally any growths of conidium chains.

It grows on complex organic agar media. On these media *Streptomyces paucisporogenes* is microscopically characterized by a yellowish-white aerial mycelium; the felting of the vegetative mycelium is thick, sometimes crazed. Occasionally, the organism secretes a small quantity of a soluble, yellow-brown pigment. The mycelium develops particularly well on a medium adjusted to pH 7.5 and comprising a decoction, in one liter of distilled water, of 200 g. of soy meal, 20 g. of glucose, 10 g. potato starch, and 20 g. of agar.

Growth on chemically defined media (Czapeck, Conn, etc.) is difficult; there is, however, solubilization of calcium malate.

On a natural substratum, such as potato slices buffered to a pH of 7, *Streptomyces paucisporogenes* develops rapidly in the form of a crazed, cerebriform, thick coating. However, mycelium growth is rare and a small aerial mycelium formed of squat hyphae which carry spores only rarely. Most of the nitrogen sources, whether of ammoniacal, amine, or nitrate nature, favor development of an aerial mycelium. Development of an aerial mycelium is also improved by the addition to the agar or liquid culture medium of small amounts of mineral salts such as sodium chloride, magnesium sulfate, potassium phosphate, as well as trace elements usually supplied by complex metabolites, such as soybean flour, liquors obtained on steeping cereal grains, distillery by-products.

While the surface culture of *Streptomyces paucisporogenes* is difficult, submerged culture is easy, especially in media containing a peptone, and is accompanied by a more pronounced secretion of the soluble pigment. Milk is quickly coagulated and peptonized; on the other hand, the secretion of gelatinolytic diastases is very weak.

The following Table L shows the characteristic differences between this new actinomycetes and other actinomycetes which produce basic antibiotics.

TABLE L

| No. | Actinomyces | Antibiotic produced | Aerial mycelium | | | | | | Reduction of nitrates |
| | | | Nutritive agar-medium | Czapeck agar-medium | Potato substrate | Starch agar-medium | Aerial hyphae | Milk | |
|---|---|---|---|---|---|---|---|---|---|
| 1 | Albogriseolus | Complex neomycin | White becoming ash-grey | White to ash-grey | Greyish white to pink | Hydrolysis | Spirals | | + |
| 2 | Fradiae | Neomycin | Pink | Sea-shell pink | In small quantity | do | No spirals | | − |
| 3 | Roseoflavus | do | White to pink | White to pinkish yellow | None | Grows abundantly | Spirals | Coagulation peptonization | + |
| 4 | 2103 | Framycetin | Violaceous pink | | Roseate white | Hydrolysis | do | No coagulation | + |
| 5 | Griseus | Streptomycin | Grey-green | Grey-green | White | Strong hydrolysis | No spirals | Coagulation peptonization | + |
| 6 | Bikiniensis | do | White | Pale-grey | Ochrous beige | Slight hydrolysis | do | Gradual hydrolysis | |
| 7 | Lavendulae | Complex streptomycin | Lavender pink | Wine-colored pink | Black | Hydrolysis | Spirals | No coagulation | + |
| 8 | Vinaceus | Viomycin | Grey to grey-blue | | | Moderate hydrolysis | No spirals | | |
| 9 | Paucisporogenes | Paromomycin and antifongine | Yellowish white | None—does not grow | Yellow-grey | None—does not grow | do | Coagulation peptonization | − | of greyish-white color with yellow reflections, if present.

On a synthetic agar culture medium *Sterptomyces paucisporogenes* produces a mycelium of lemon yellowish or clear beige color. The aerial mycelium is white or slightly pinkish and forms straight hyphae of a diameter of 1.5μ to 2.0μ. The fascicular branched portions are very fine and have a diameter of 1.0μ to 1.5μ. The end parts of said filaments often terminate in chains of 5 to 20 spherical or oval spores the diameter of which is the same as that of the supporting filaments. The dimensions of said conidia are about 1.0μ to 1.5μ x 1.0μ to 2.0μ.

On a complex organic agar medium containing yeast autolysate, *Streptomyces paucisporogenes* there develops Thus, the new microorganism *Streptomyces paucisporogenes* differs from known Streptomyces species as they are described, for instance, by Waksman et al., "The Actinomycetes and Their Antibiotics," published, 1953, by Williams and Wilkins, on pages 11, 55, and 65, by the characteristic properties of the aerial mycelium shown in the following Table M.

TABLE M

| No. | Streptomyces species | Antibiotic produced | Aerial mycelium | | | | | | Reduction of nitrates |
| | | | Nutritive agar medium | Czapeck agar medium | Potato substrate | Starch agar medium | Aerial hyphae | Milk | |
|---|---|---|---|---|---|---|---|---|---|
| 1 | Streptomyces erythreus | Erythromycin | Cream-colored | White | Cream-colored becoming yellowish | Hydrolysis | Spirals | Coagulation and peptonization | + |
| 2 | Streptomyces flavogriseus | Not indicated | do | do | Grey | | A few curling tips. No tips spirals | ? | ? |
| 3 | Streptomyces antibioticus | Actinomycin | Yellowish to yellowish green | Grey | No aerial mycelium | | | No coagulation nor peptonization | ? |
| 4 | Streptomyces paucisporogenes | Paromomycin and antifongine | Yellowish-white | No aerial mycelium; does not grow | Yellowish grey | No growth | No spirals | Coagulation and peptonization | − |

It is clearly evident that the *Streptomyces paucisporogenes* species according to the present invention is a species different from the known species.

The fluid culture media of *Streptomyces paucisporogenes* exhibit also antibiotic activity which increases with the pH of the agar on which the potency control test is carried out. This shows that the new antibiotic belongs to the group of basic antibiotics: streptomycin, streptothricin, neomycin, framycetin, but the indications supplied by a so-called crossed antibiosis test point to essential differences which exist between *Streptomyces paucisorogenes* and those microorganisms which produce the above-named antibiotics (Table N).

TABLE N

*Sensitivity of Different Streptomyces to the Principal Antibiotics*

0 = not sensitive  
± = Very little sensitive  
+ = Fairly sensitive  
++ = Very sensitive

| Antibiotics | Paucisporogenes | Griseus | Lavendulae | Fradiae | 2103 |
|---|---|---|---|---|---|
| Streptomycin | ++ | 0 | ++ | ++ | ++ |
| Neomycin | ± | + | ± | 0 | 0 |
| Viomycin | + | 0 | + | + | + |
| Framycetin | ± | + | ± | 0 | 0 |
| Erythromycin | ++ | 0 | + | + | + |
| Aureomycin | ± | ++ | + | ++ | ++ |
| Terramycin | + | ++ | + | ++ | ++ |
| Chloramphenicol | + | ± | ++ | ++ | ++ |
| Paromomycin | 0 | ++ | ± | ± | ± |

The new Streptomyces species according to the present invention has been called hereinbefore and will be called hereinafter and in the claims annexed thereto *"Streptomyces paucisporogenes"* indicating that the species is characterized by the difficulty with which sporulation is effected under conventional cultivation conditions.

The following tests were carried out in order to prove that the new species *Streptomyces paucisporogenes* is clearly distinguished from the species *Streptomyces rimosus* forma *paromomycinus* which does not produce the new fungicidal compound Antifongine. These comparative tests were carried out according to the method suggested by T. G. Pridham, C. W. Hesseltine, and R. G. Benedict for classifying Streptomycetes according to selected groups (see "Applied Microbiology," January 1958, vol. 6, pages 52 to 79). The criterion used by Pridham et al. for differentiation of Streptomyces species in the morphology of the sporophores of mature cultures.

S. A. Waksman uses a different method of differentiation in his book "The Actinomycetes and Their Antibiotics," published by Williams and Wilkins, Baltimore, Md., 1953, namely the microscopical and macroscopical comparison of the fungi, cultivated at the same time and under the same conditions on a series of agar-containing nutrient media as they are conventionally used in microbiology.

The following Table O shows comparative results of cultivation of the original strain of *Streptomyces paucisporogenes* and of a sporulated variant in comparison with *Streptomyces rimosus* forma *paromomycinus* P 57 with respect to the following criteria:

(1) Growth  
(2) Vegetative mycelium  
(3) Aerial mycelium  
(4) Spores, and  
(5) Pigmentation of the medium

TABLE O

| | Criteria | S. paucisporogenes original | S. paucisporogenes sporulated form | S. rimosus forma paromomycinus |
|---|---|---|---|---|
| Non-specific culture medium: | | | | |
| Czapek | 1 | No growth | Slight + | ±. |
| | 2 | | Colorless | Colorless. |
| | 3 | | White, scanty | 0. |
| | 4 | | 0 | 0. |
| | 5 | | 0 | 0. |
| Potato | 1 | ++ | ++ | ++. |
| | 2 | Light yellow | Light yellow | Translucent. |
| | 3 | White, very scanty | White, scanty | 0. |
| | 4 | 0 | 0 | 0. |
| | 5 | 0 | 0 | 0. |
| Yeast extract | 1 | +++ | +++ | +++. |
| | 2 | Dark maroon | Light maroon | Light yellow. |
| | 3 | Grey, scanty | Light grey abundant | 0. |
| | 4 | 0 | 0 | 0. |
| | 5 | Dark maroon | Light maroon | 0. |
| Meat extract | 1 | +++ | +++ | +++. |
| | 2 | Light yellow | Light yellow | Translucent. |
| | 3 | 0 | 0 | 0. |
| | 4 | 0 | 0 | 0. |
| | 5 | Dark yellow | Light yellow | 0. |
| N Z amine | 1 | +++ | +++ | +++. |
| | 2 | Dark maroon | Light maroon | Pale yellow. |
| | 3 | Grey beige scanty | Dark beige scanty | Crackled, white, scanty. |
| | 4 | 0 | 0 | +. |
| | 5 | Very intense maroon | Intense maroon | 0. |
| Specific culture media: | | | | |
| Dextrin-calcium No. 253 | 1 | +++ | +++ | +++. |
| | 2 | Light maroon | Yellowish brown | Light maroon. |
| | 3 | Dark grey, scanty | Abundant, pinkish beige | Scanty, light grey. |
| | 4 | 0 | ± | ++++. |
| | 5 | 0 | 0 | 0. |
| Malt calcium extract No. 265 | 1 | +++ | +++ | +++. |
| | 2 | Maroon | Maroon | Light beige. |
| | 3 | Dark grey scanty | Abundant, pinkish beige | White, traces. |
| | 4 | 0 | ++ | 0. |
| | 5 | 0 | 0 | 0. |
| Corn-steep lactose No. 275 B | 1 | ++ | ++ | ++. |
| | 2 | Colorless | Colorless | Colorless. |
| | 3 | Nothing | Nothing | Scanty, white. |
| | 4 | 0 | 0 | 0. |
| | 5 | 0 | 0 | 0. |

The first five culture media which are designated as "non-specific media" are those used by various authors for characterization and differentiation.

I. COMPARISON OF THE SPOROPHORES ON AN OPTIMUM CULTURE MEDIUM (a) The original strain of *Streptomyces paucisporogenes* does not sporulate on any of the tested culture media.

This negative characteristic distiguishes the strain clearly from all other species of Streptomyces described heretofore.

(b) Its sporulating variant shows abundant sporulation on the calcium-malt extract medium No. 265.

(c) *S. rimosus* forma *paromomycinus* and *S. paucisporogenes* (sporulating variant) were compared on their optimum culture media.

The following Table P shows the results obtained thereby.

TABLE P

| S. rimosus forma paromomycinus | S. paucisporogenes sporulating variant |
|---|---|
| Dextrin-calcium medium (optimum culture medium) No. 253. | Malt extract-calcium medium (optimum culture medium) No. 265. |
| Non-verticillated sporophores, irregular branching. | Verticillated sporophores generally 2 branches per verticil. |
| Lateral branches coiled to spirals or agglomerated. | Lateral branches coiled to spirals or agglomerated. |
| Long chains of spores. | Short chains of spores. |
| According to Pridham: Section "Spira." | Section "monoverticillus-spira." |

Czapeck:
　Saccharose _____ 5
　Sodium nitrate _____ 2
　Dipotassium phosphate _____ 1
　Potassium chloride _____ 0.5
　Magnesium sulfate.H$_2$O _____ 0.5
　Ferrous sulfate _____ 0.01
　Agar _____ 25

Yeast extract:
　Glucose _____ 5
　Yeast extract _____ 10
　Dipotassium phosphate _____ 0.25
　Magnesium sulfate.H$_2$O _____ 0.25
　Agar _____ 25

N Z amine:
　Potato _____ 100
　N Z amine A _____ 10
　Agar _____ 20

Malt-calcium 265:
　Malt extract _____ 30
　Ammonium sulfate _____ 5
　Sodium nitrate _____ 1
　Magnesium sulfate _____ 0.1
　Ferrous sulfate _____ 0.015
　Manganous sulfate _____ 0.015
　Dipotassium phosphate _____ 0.5
　Calcium carbonate _____ 5
　Sodium chloride _____ 1.5
　Zinc sulfate _____ 0.015
　Agar _____ 20

Corn-steep lactose:
　Lactose _____ 5
　Corn-steep liquor _____ 5
　Ammonium sulfate _____ 0.15
　Calcium carbonate _____ 0.5
　Agar _____ 25
　Dipotassium phosphate _____ 0.4
　Magnesium sulfate _____ 0.4

Potatoes:
　Potato _____ 200
　Glucose _____ 20
　Agar _____ 20

Meat extract:
　Glucose _____ 10
　Heart extract _____ 5
　Soybean peptone _____ 5
　Calcium carbonate _____ 1
　Sodium chloride _____ 5
　Agar _____ 20

Dextrin-calcium 253:
　Dextrin _____ 10
　Corn-steep liquor _____ 1
　"Soludri" _____ 5
　Ammonium sulfate _____ 10
　Sodium nitrate _____ 2
　Zinc sulfate _____ 0.03
　Agar _____ 20
　Dipotassium phosphate _____ 1
　Calcium carbonate _____ 10
　Sodium chloride _____ 3
　Magnesium sulfate _____ 0.02
　Ferrous sulfate _____ 0.03
　Manganous sulfate _____ 0.007

The following Table Q shows the differences between the species *Streptomyces paucisporogenes* and *Streptomyces rimosus* forma *paromomycinus* NRRL 2455 on other agar-containing culture media. In said table, A indicates *Streptomyces rimosus* and B *Streptomyces paucisporogenes*.

TABLE Q

| Agar containing culture medium | Vegetative mycelium | | Aerial mycelium | | Soluble pigment | |
|---|---|---|---|---|---|---|
| | A | B | A | B | A | B |
| Glycerol-asparagine | Light yellow to light brown. | Greyish. | White. | No mycelium formed. | None formed. | None formed. |
| Synthetic starch | Light brown. | Feeble growth. | White, slight formation. | do. | do. | Faintly maroon colored. |
| Calcium malate | Light brownish yellow. | do. | White. | Greyish. | do. | Maroon. |
| Agar nutrient medium | Yellowish orange to light brown. | Yellowish white. | Little or no mycelium formed. | Light maroon to greyish. | do. | Do. |
| Glucose tryptone | Light yellow to light brown. | Greyish beige. | White. | Whitish beige. | Faint light brown coloration. | Light maroon. |

The cultures of the two species of Streptomyces exhibit the following characteristic features:

A. *Streptomyces rimosus* forma *paromomycinus* NRRL 2455.—The surface colonies are raised, smooth, wrinkled or plaited, and cracked at the regions of intense growth. Often the agar itself is cracked. Under the microscope the aerial hyphae are irregularly branched. The lateral branches are short and coiled. Numerous spirals are present extending over the greater part of the medium and are frequently found in dense agglomeration. The terminal parts of the aerial hyphae are subdivided in chains of spores. Litmus milk is ordinarily not peptonized.

B. *Streptomyces paucisporogenes*.—The surface colonies are covered with a beige, discrete, readily autolyzed aerial mycelium. The mycelium is composed of long entangled filaments, which can be parted with difficulty only. Under the microscope long, tin, only slightly branched hyphae are observed which, even when young, rapidly undergo lysis to a large extent. There are no spirals. Propagation of the mycelium is achieved by budding of portions of the filaments which have not undergone lysis. Sporulation which is always very feeble, proceeds only under very favorable circumstances and on especially adapted culture media.

There are also differences in the utilization of carbohydrates. Both microorganisms utilize the carbohydrates in a synthetic agar medium according to Pridham and Gottlieb, "J. Bact.," vol. 56, p. 108 (1948), in the following manner:

TABLE R

| Carbohydrate | Streptomyces rimosus forma paromomycinus | Streptomyces paucisporogenes |
|---|---|---|
| Glucose | + | + |
| Lactose | + | + |
| Maltose | + | + |
| Dextrose | + | + |
| Inulin | + | ± |
| Glycerol | + | + |
| Saccharose | − | + |

The following examples serve to illustrate the present invention without, however, limiting the same thereto. More particularly, the reaction time and temperature, the nature of the reagents and the solvents may be varied by those skilled in the art in accordance with the principles set forth herein and in the claims annexed thereto.

EXAMPLE 1

*Shaker Fermentation*

The following materials are used to prepare an aqueous fermentation medium:

|  | G. |
|---|---|
| Glycerol | 10 |
| Bacteriological peptone | 18 |
| Corn steeping liquor | 3 |
| Sodium chloride | 4 |
| Calcium carbonate | 1 |

With distilled water made up to 1000 cc.

200 cc. portions of the medium are filled into Erlenmeyer flasks which are then sterilized at 121° C. for thirty minutes. The flasks are cooled and inoculated with an aqueous suspension of an ATCC 12596 strain of *Streptomyces paucisporogenes* obtained as surface growth on a nutrient agar medium. The flasks are kept for 7 days at 30° C. on an oscillating shaker (80 oscillations per minute; extent of oscillation—7 cm.).

EXAMPLE 2

*Semi-Industrial Aerobic Fermentation*

The following materials are used to prepare an aqueous fermentation medium:

|  | G. |
|---|---|
| Peanut flour | 26 |
| Lumped sugar | 13 |
| Dextrin | 10 |
| Sodium chloride | 5 |
| Calcium carbonate | 2 |

With distilled water made up to 1000 cc.

200 cc. portions of the medium are filled into Erlenmeyer flasks which are then sterilized at 121° C. for thirty minutes. The flasks are cooled and inoculated with a suspension of an ATCC 12596 strain of *Streptomyces paucisporogenes* obtained as surface growth on a nutrient agar medium. The flasks are kept at 30° C. for 48 hours on an oscillating shaker as set forth in Example 1. The entire fermentation liquor obtained in this manner is then aseptically decanted into a stainless steel 500 liter fermentor containing 350 liters of the following medium previously sterilized:

|  | Percent |
|---|---|
| Soybean meal | 2.5 |
| Corn starch | 1.3 |
| Lumped glucose | 1.0 |
| Calcium carbonate | 0.2 |
| Tap water | 95.0 |

The seeded wort is vigorously shaken and aerated by injecting sterile air at the rate of 350 liter per minute and is kept fermenting for 70 hours at 30° C.

EXAMPLE 3

*Preparation of the Product Containing the Fungicidal Compound Antifongine for Use in Agriculture*

100 liters of a culture obtained according to Examples 1 or 2 are stirred with 1 kg. of diatomaceous earth. The homogeneous mixture is filtered through a filter press by means of compressed air. The filter press cloth has previously been treated with an aqueous suspension of diatomaceous earth. 18 kg. of a moist filter cake are obtained. The filter cake is placed on and uniformly distributed over trays and is dried in a vacuum chamber at a vacuum of 25 mm./Hg by heating the trays to 45° C. or drying is effected in a ventilated drying oven heated to 50° C. Drying is completed in about 15 hours. The dried product is pulverized in an impact pulverizer or hammer mill, for instance, of the "Forplex" type provided with classifier, and is then finely ground in a cylindrical homogenizer mill until a very fine homogeneous powder of a grain size of less than $25\mu$ is obtained. The yield is 5 kg. of the agricultural product containing the fungicidal compound Antifongine.

EXAMPLE 4

*Preparation of the Crude Fungicidal Compound Antifongine From the Mycelium of a Culture of Streptomyces paucisporogenes (ATCC 12596)*

The mycelium is obtained by filtering off the culture medium obtained as described in Examples 1 or 2 and drying the filter cake.

100 g. of dry mycelium are stirred for one hour with 200 cc. of methanol containing 10% of calcium chloride and the mixture is filtered. Such extraction is repeated 4 times. To each extract 100 cc. of water are added and methanol is distilled off in a vacuum. The resulting precipitate is separated from the aqueous mother liquor by filtration. The following amounts of precipitate are obtained:

|  | G. |
|---|---|
| Extract No. 1 | 0.96 |
| Extract No. 2 | 2.04 |
| Extract No. 3 | 0.99 |
| Extract No. 4 | 0.68 |
| Extract No. 5 | 0.47 |
| Total amount | 5.14 |

The total amount of the resulting precipitate has a fungicidal activity against *Saccharomyces cerevisiae* in a dilution of 0.1 γ/cc. and against *Candida albicans* in a dilution of 0.1 γ/cc. to 1.0 γ/cc. The compound shows an U.V. absorption intensity of $$E_{1\ cm.}^{1\%} = 230 \text{ at } 3800 \text{ angstroms}$$

in a mixture of methanol, acetic acid, and water (7:2:1).

EXAMPLE 5

*Purification of the Crude Fungicidal Compound Antifongine and Preparation of Amorphous Fungicidal Compound Antifongine*

20 g. of crude fungicidal compound Antifongine obtained according to Example 4, are dissolved in a mixture of 120 cc. of dioxane, 90 cc. of pyridine, 54 cc. of butyl acetate and 156 cc. of water. Undissolved matter is filtered off. The solution is passed over a column of 600 g. of activated aluminum oxide which is then washed with 1045 cc. of the same solvent mixture until the first yellow colored inactive layer which moves rather rapidly has disappeared. The main fraction is eluted by means of 1060 cc. of a mixture of dioxane, water, and butyl acetate (40:52:18) containing 5% of acetic acid. The resulting eluate is poured into a mixture of 10 liters of ether and 1 liter of methanol. The precipitated compound is filtered off. 6.5 g. of an amorphous yellow compound are obtained. The U.V. absorption intensity of said compound is $$E_{1\,cm.}^{1\%} = 585 \text{ at } 3800 \text{ angstroms}$$

EXAMPLE 6

*Purification of the Amorphous Fungicidal Compound Antifongine*

20 g. of the amorphous fungicidal compound Antifongine are dissolved at 80° C. in 200 cc. of a solvent mixture of pyridine, dioxane, water, and butyl acetate (30:40:52:18). The solution is allowed to stand in the ice box. 10.05 g. of a crystalline compound are obtained which has an U.V. absorption intensity of $$E_{1\,cm.}^{1\%} = 736 \text{ at } 3800 \text{ angstroms}$$

in aqueous methanol containing acetic acid. The compound is recrystallized twice from the same solvent mixture. 8.4 g. of the crystalline Antifongine are finally obtained having an U.V. absorption intensity of $$E_{1\,cm.}^{1\%} = 764 \text{ at } 3800 \text{ angstroms}$$

This new compound represents a yellow powder which shows the characteristic extinction pattern of a crystalline compound under a polarization microscope. The crystals have an extremely low solubility in water, hydrocarbons, ketones, and chlorinated solvents. They are slightly soluble in lower alcohols and in carbon disulfide and soluble in propylene glycol, isoquinoline, pyridine, triethylamine, and dimethylformamide.

*Analysis.*—63.6% C, 7.8% H, 2.8% N, 1.3% ash.

EXAMPLE 7

*Preparation of Antifongine From the Liquid Filtrate of a Culture of* Streptomyces paucisporogenes *(ATCC 12596)*

The culture medium obtained according to Examples 1 or 2, is centrifuged and filtered. The pH-value of the filtrate is adjusted to a pH of 6.0 by the addition of dilute (1:1) sulfuric acid. The solution is treated with "Amberlite IRC 50" (U.S.P. 2,340,111) which previously had been treated with N sodium hydroxide solution and washed with distilled water until neutral.

130 liters of the resulting resin-treated solution are evaporated to dryness in a vacuum. The residue is extracted three times, each time with 10 liters of methanol. The methanolic solution is concentrated under reduced pressure to 500 cc. Two liters of water are added. The mixture is extracted 4 times, each time with 1 liter of butanol. The combined extracts are concentrated under reduced pressure to 300 cc. and are filtered. Ten times the volume of the concentrated extracts of a mixture of acetone and petroleum ether (boiling range: 30–60° C.) in the proportion of 1:2 is added. The precipitate is filtered off. 11.3 g. of crude Antifongine are obtained.

It shows a threshold value (minimum inhibitory effect of 0.1 γ/cc. with respect to *Saccharomyces cerevisiae* and a threshold value of 0.1 γ/cc. to 1.0 γ/cc. on *Candida albicans* in an agar medium.

EXAMPLE 8

*Purification of the Crude Antifongine*

5 g. of the crude Antifongine prepared according to the preceding Example 7, are dissolved in a mixture of 250 cc. of methanol and 125 cc. of water. The solution is passed over a column of 10 g. of the acidic form of a sulfonyl group-containing cation exchange resin known to the trade as "Amberlite IR 120" (U.S.P. 2,340,111) and then over a column of 20 g. of the hydroxylated form of the anion exchange resin known to the trade as "Amberlite IR 4 B" (U.S.P. 2,591,573). The purified solution is concentrated in a vacuum, taken up with 100 cc. of tertiary butanol at 35° C. and evaporated to dryness by lyophilizing. 3.5 g. of purified Antifongine are obtained. Said product may further be purified by chromatographic absorption and recrystallization as described in detail in Examples 5 and 6.

EXAMPLE 9

*Preparation of an Emulsifiable Concentrate for Agricultural Purposes*

1 g. of crude Antifongine,
10 g. of ethoxy ethanol,
500 mg. of calcium chloride,
10 mg. of 2,6-di-(tertiary butyl)-p-cresol, and
100 mg. of a polyoxy ethylene substituted alkyl phenol are intimately mixed with each other and the mixture is diluted with 5 l. to 10 l. of water. Thereby, a stable suspension is obtained which is applied by spraying and which is effective against *Venturia inaequalis*, Botrytis, Oïdium, and the like fungi.

EXAMPLE 10

*Preparation of a Fungicidal Powder for Agricultural Use*

The crude Antifongine is dissolved in alcohol which may contain calcium chloride. An antioxidant of the tertiary butyl phenol type, for instance, 2,6-di-(tertiary butyl)-p-cresol, is added in an amount of 0.01% to 1.0%. The resulting solution is sprayed over an inert powder, such as calcium carbonate, talc, clay, or dried silica gel. The mixture is dried at a low temperature in a vacuum and the dried product is ground mechanically to yield a powder with a grain size of about 10µ. This powder is diluted by mixing it with a finely powdered inert carrier of about the same density in such a way that the resulting mixture contains about 20 g. of the crude Antifongine per kg. This powder is applied in amounts of about 25 kg. per hectare.

Of course, the crude Antifongine as well as the agricultural product obtained from the mycelium according to Example 3 may be converted not only into powders and emulsifiable preparations of Examples 9 and 10 but also into other preparations, such as solutions in propylene glycol or mixtures of solvents which may be applied by spraying to the plants to be treated. Ordinarily, it is not necessary to use the purified amorphous compound of Example 5 or the crystalline compound of Example 6. Such purified compounds, however, may be useful in animal therapy for the treatment of fungus infections.

Separation of Paromomycin from the culture filtrate is described more in detail in copending application Serial No. 592,258, filed June 19, 1956, and entitled "New Antibiotic and Method of Preparing Same."

We claim:

1. The fungicidal compound Antifongine produced by cultivating *Streptomyces paucisporogenes* on an aqueous medium containing minerals and assimilable sources of carbon and nitrogen and recovering Antifongine having the following characteristics:
   (1) The compound being composed of carbon, hydrogen, nitrogen, and oxygen;
   (2) analysis of said compound showing a product containing about 1.3% of ash;
      about 63.6% C;
      about 7.8% H; and
      about 2.8% N;
   (3) being effective against fungi and yeasts including phytopathogenic fungi;
   (4) having a negative ninhydrin, benzidine, Tollens, 2,4-dinitro phenyl hydrazine ferric chloride, picric acid, and Reinecke salt tests and having a positive ceric nitrate test;
   (5) giving with hydroxylamine an amorphous precipitate;
   (6) being soluble in propylene glycol, isoquinoline, pyridine, triethylamine, and dimethylformamide;
   (7) being slightly soluble in lower alkanols and carbon disulfide;

(8) having an extremely low solubility in water, hydrocarbons, ketones, and chlorinated solvents;

(9) dissolving in concentrated sulfuric acid, phosphoric acid, hydrochloric acid, perchloric acid and formic acid, thereby yielding an intensely blue or green solution which, on dilution with water, changes its color to yellow;

(10) the ultraviolet spectrum of a solution in aqueous methanolic acetic acid (proportion: 7 parts by volume of methanol to 2 parts by volume of acetic acid to 1 part by volume of water) having the following maxima and extinction values:

Maxima in angstroms:

| | $E_{1cm}^{1\%}$ |
|---|---|
| 2910 | 140 |
| 3450 | 340 |
| 3600 | 540 |
| 3800 | 764 |
| 4050 | 636 |

(11) having a characteristic infrared spectrum having transmission maximums at $5.85\mu$, $6.12\mu$, $9.63\mu$ and $13.16\mu$; absorption maximums at $6.27\mu$, $8.5\mu$, $9.35\mu$, $10.0\mu$, $11.28\mu$ and $11.82\mu$; and shoulders at $6.40\mu$, $8.85\mu$, $9.10\mu$ and $10.30\mu$;

(12) having substantially no phytotoxicity;

(13) said compound in substantially pure state being a yellow crystalline powder; and

(14) starting to decompose, on heating, at 100° C.

2. A composition for combatting phytopathogenic fungi comprising Antifongine of claim 1 and an inert carrier.

3. A composition for combating phytopathogenic fungi comprising, as active fungicidal agent, Antfongine according to claim 1, and an aqueous emulsion base, said fungicidal compound being emulsified in said emulsion base.

4. A composition for combating phytopathogenic fungi comprising, as active fungicidal agent, the finely pulverized Antifongine according to claim 1, and a finely pulverized inert carrier, said fungicidal compound being intimately mixed with and uniformly distributed throughout said inert carrier.

5. The process of combating phytopathogenic fungi, said process comprising applying to plants affected by such phytopathogenic fungi a composition containing Antifongine according to claim 1.

6. In a process of preparing Antifongine, the steps comprising extracting a mycelium obtained from a culture of Streptomyces paucisporogenes with methanol containing calcium chloride, adding water to the extracts, distilling off methanol, filtering off the precipitate, and purifying said precipitate by chromatographic absorption and recrystallization.

7. The process according to claim 6, wherein Antifongine is purified by chromatographic absorption on activated aluminum oxide and wherein a mixture of dioxane, water, and butyl acetate in the approximate proportion of 40:52:18, said mixture containing 5% of acetic acid is used as eluting solvent.

8. The process according to claim 7, wherein Antifongine is recrystallized from a mixture of pyridine, dioxane, water, and butyl acetate in the approximate proportion of 30:40:52:18.

9. In a process of preparing Antifongine, the steps comprising evaporating to dryness a filtrate of a culture of Streptomyces paucisporogenes substantially free of paromomycin formed during fermentation, taking up the residue with methanol, concentrating the solution, adding water to the solution, extracting the resulting mixture with butanol, concentrating by evaporation the butanol solution, adding thereto a mixture of acetone and petroleum ether, filtering off the precipitate, treating the precipitate with ion exchange resins in aqueous methanol, concentrating the thus treated and purified solution, extracting the concentrate by means of tertiary butanol, and purifying the crude Antifongine isolated from the butanol solution by chromatographic absorption and recrystallizaion.

10. The process according to claim 9, wherein Antifongine is purified by chromatographic absorption on activated aluminum oxide and wherein a mixture of dioxane, water, and butyl acetate in the approximate proportion of 40:52:18, said mixture containing 5% of acetic acid is used as eluting solvent.

11. The process according to claim 10, wherein Antifongine is recrystallized from a mixture of pyridine, dioxane, water, and butyl acetate in the approximate proportion of 30:40:52:18.

References Cited in the file of this patent

UNITED STATES PATENTS 2,865,815    Lindefelser et al. _____ Dec. 23, 1958

OTHER REFERENCES

Frohardt et al.: Belgium, 547,976, May 16, 1956 (thru Recueil des Brevets d'Invention, May 31, 1957 page 879).

Kaplan et al.: Antibiotics and Chemotherapy, vol. VIII, No. 10, October 1958, pages 491–495.

Annales Pharm. Français, vol. 12 (1954), page 440.

UNITED STATES PATENT OFFICE
CERTIFICATE OF CORRECTION

Patent No. 3,052,605                      September 4, 1962

Guy Hagemann et al.

It is hereby certified that error appears in the above numbered patent requiring correction and that the said Letters Patent should read as corrected below.

Column 6, line 40, for "shown" read -- show --; column 13, after "TABLE P" line 20, insert the following

Composition of the culture media used in these tests

The amounts given in g. are those per 1000 g. of culture medium. The difference between the given amounts and 1000 g. is made up with water.

Signed and sealed this 16th day of April 1963.

(SEAL)
Attest:
ERNEST W. SWIDER                     DAVID L. LADD
Attesting Officer                       Commissioner of Patents